(No Model.) 3 Sheets—Sheet 1.

R. B. ROBBINS.
CORN CUTTING HARVESTER.

No. 309,648. Patented Dec. 23, 1884.

Attest
J. Paul Mayer

Inventor
Richard B. Robbins
By Tho. S. Sprague
Atty (No Model.) 3 Sheets—Sheet 2.

R. B. ROBBINS.
CORN CUTTING HARVESTER.

No. 309,648. Patented Dec. 23, 1884.

Attest
J. Paul Mayer

Inventor
Richard B. Robbins
By Thos. S. Sprague
Atty (No Model.) 3 Sheets—Sheet 3.

R. B. ROBBINS.
CORN CUTTING HARVESTER.

No. 309,648. Patented Dec. 23, 1884.

Attest
J. Paul Mayer

Inventor
Richard B. Robbins
By Thos. S. Sprague,
Att'y

United States Patent Office.

RICHARD B. ROBBINS, OF ADRIAN, MICHIGAN.

CORN-CUTTING HARVESTER.

SPECIFICATION forming part of Letters Patent No. 309,649, dated December 23, 1884.

Application filed November 28, 1883. (No model.)

*To all whom it may concern:*

Be it known that I, RICHARD B. ROBBINS, of Adrain, in the county of Lenawee and State of Michigan, have invented new and useful Improvements in Corn-Cutting Harvesters; and I do hereby declare that the following is a full, clear, and exact description thereof, reference being had to the accompanying drawings, which form a part of this specification.
This invention relates to machines for harvesting corn or other similar crops which are planted in rows and harvested by being cut above the surface of the ground.

Figure 1:
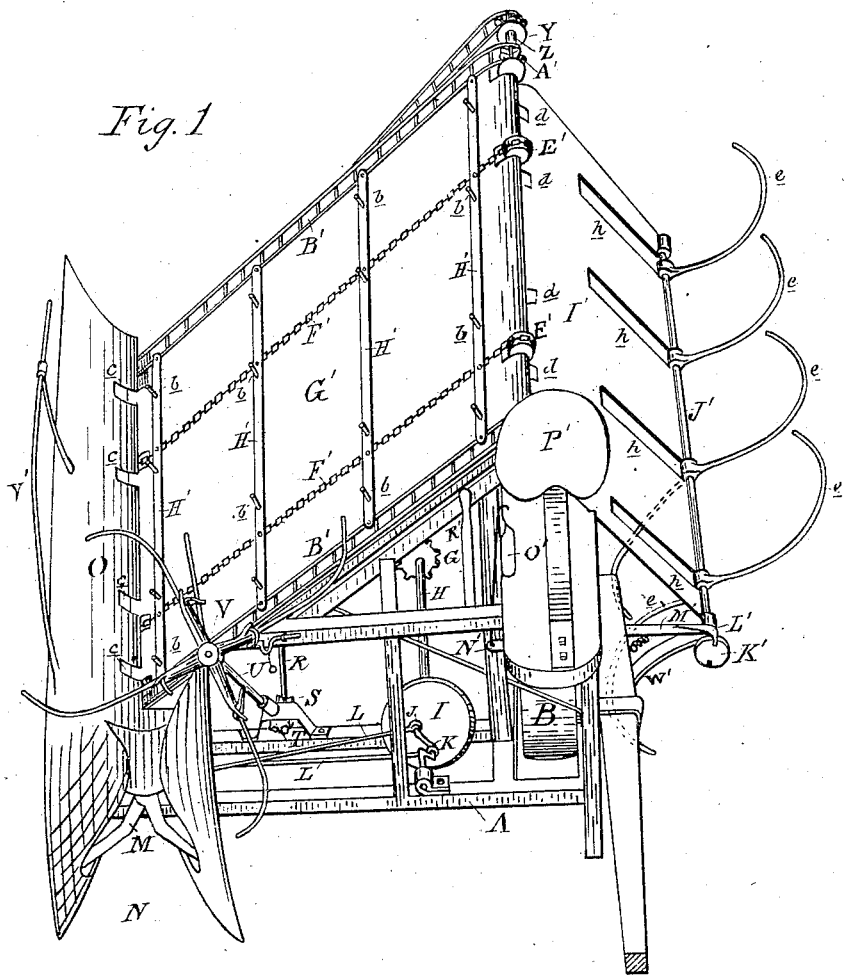
Figure 2:
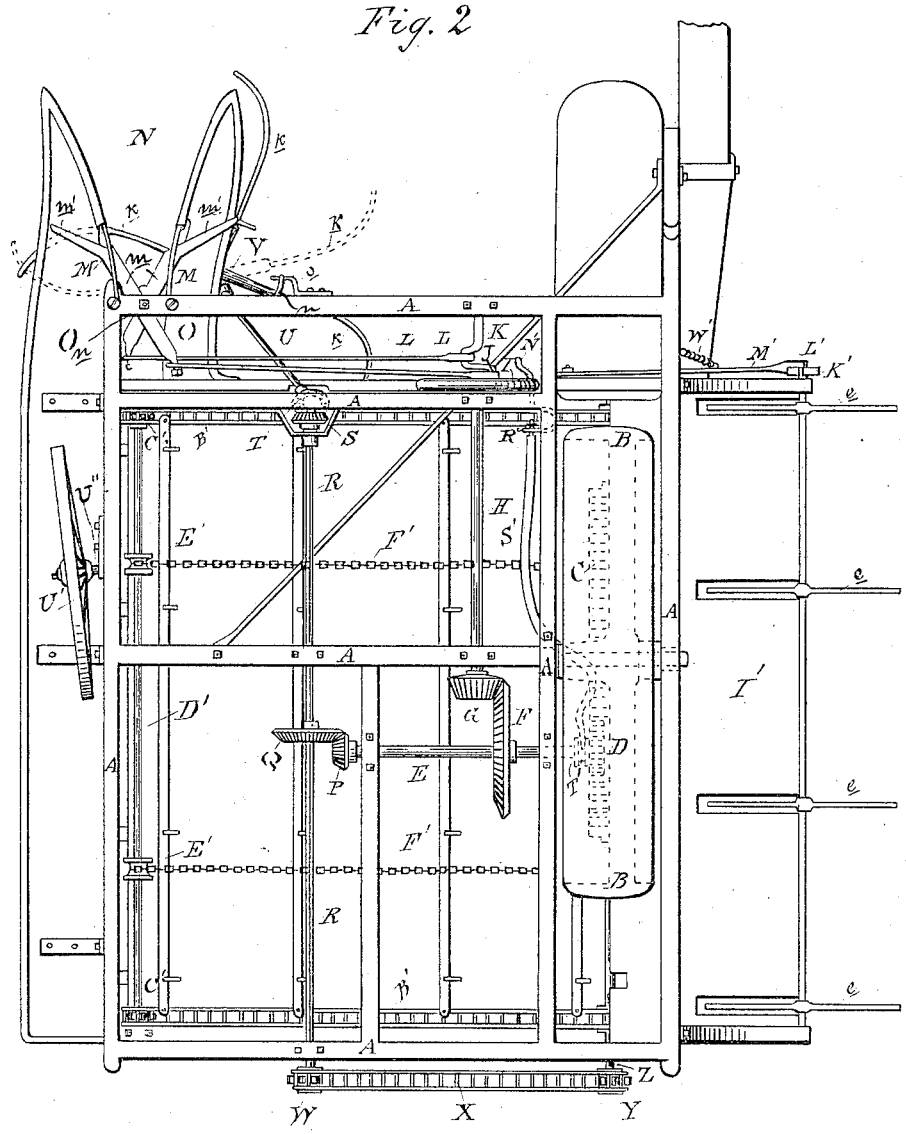
Figure 3:
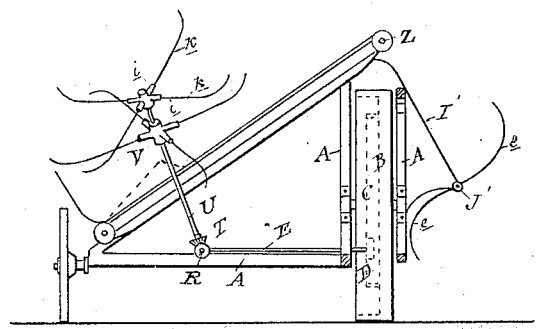
Figure 4:
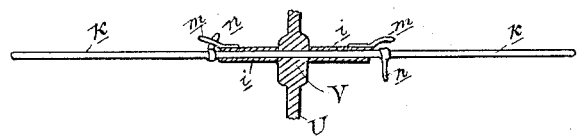

The invention consists in the details of construction and the combination of the various parts by means of which the stalks are held upright while being cut, and are then deposited upon a carrier which delivers them into a cradle, whence, when a sufficient number are gathered to form a gavel or bundle, they are deposited by the rotation of said cradle at the will of the driver, all as more fully hereinafter described, and particularly pointed out in the claims.
Figure 1 is a front perspective view looking down upon the machine. Fig. 2 is a bottom plan view. Fig. 3 is a front elevation showing some of the principal parts of the machine, and Fig. 4 is a vertical section through the reel and shaft.

A represents a frame to sustain the operating parts of the machine. B is a traction-wheel, suitably journaled in the frame at one side. Upon the inner side of this wheel there is secured an internally-toothed ring, C, meshing with the pinion D, secured upon the shaft E. Upon this shaft is secured the bevel-gear wheel F, engaging the bevel-pinion G, rigidly secured on the inner end of the shaft H, upon the outer end of which is secured the crank-wheel I, carrying upon its outer face a double crank, consisting of the wrist-pin J and the crank-shaft K, joining the wrist-pin, to each of which is suitably secured a pitman, L, connecting with the knives M, which are pivoted to the main frame at a point, n, midway between the sides of the mouth N, said knives consisting of the blades m and guards m', extending outward therefrom in an inclined direction, and, working through slots in the sides of the mouth, serve to prevent the stalks getting behind the blades when the same are making a cut. The outer end of the shaft E is provided with a bevel-pinion, P, engaging a bevel gear-wheel, Q, on the shaft R, which latter carries upon its forward end a bevel-pinion, S, engaging the bevel-pinion T on one end of the shaft U, the opposite end of which carries the reel V. The rear end of shaft R is provided with a sprocket-wheel, W, over which passes the chain-band X, which likewise passes over the sprocket-wheel Y upon the end of a shaft, Z, journaled at the top of the frame.

Near each end of shaft Z is a sprocket-wheel, A', over which passes a chain-band, B', which also passes over sprocket-wheel C', secured to each end of the shaft D'. The shafts Z and D' are also provided with pulleys E', over which run chains F', which pass above and beneath the sloping table G'. To these chains are attached the carrier-bars H, to which are secured fingers $b$, which, during the movement of the chains around the shaft, pass through slots $c$ cut in the trough O, and through slots $d$ cut in the upper edge of the downwardly-inclined apron-guide I'.

At the lowest point of the downwardly-inclined apron-guide I' is journaled a shaft, J', which is provided with cradle-fingers $e$, made in the form of a letter S, and secured to the shaft midway of their length, as shown in Figs. 1 and 3.

Upon an end of the shaft J' is secured a notched disk, K'. A hook-stop, L', upon the end of the lever M', engages with one of the notches in said disk and prevents the rotation of the shaft. This lever M' is pivoted midway of its length to a suitable part of the frame, and to that end opposite to the hook L' is attached a link, N', which projects upward and connects with a treadle, O', near the driver's seat P', and within easy reach of his foot. By this means the rotation of the shaft J' is brought within control of the driver. The apron-guide I' has slots $h$, to allow the fingers $e$ to pass.

R' is a lever, the upper end of which is within reach of the driver, and serves to operate the lever S', which in turn operates the clutch T' upon the shaft E, to engage or disengage the pinion D and shaft E, as occasion may require.

U' is a supporting-wheel mounted upon a suitable stub-axle, U'', secured to the frame at the opposite side from the traction-wheel. The head V of the reel is rigidly secured to the top of the shaft U, and is provided with four hollow arms, *i*, at right angles to each other, and corresponding with similar openings through the shaft. The cylindrical reel-arms *k* are contained within these hollow arms, so that, in addition to their rotation with the shaft, they are also adapted to partially rotate on their axes, such rotation being limited by the stops *m* on the hollow arms, and the stops *n* on the reel-arms. The partial rotation of the reel-arms is caused by the stops *n* coming in contact with the arm *o* on the frame of the machine, as clearly shown in Fig. 2. In the continued rotation of the shaft the stop on the reel-arm is brought in contact with the arm *o*, to partially rotate such reel-arm into position for holding the succeeding hill of stalks. There may be more than one set of these reel-arms operating as described, which might become necessary in cutting corn in drills, while but one set of them would be necessary for successful operation in cutting corn planted in hills.

In driving to or from the field the operating mechanism is thrown out of gear by the means described, which on arriving in the field is reversed, to throw the operating parts into engagement with the main traction-wheel. The machine is then placed so that the flaring gathering-mouth N of the trough O is presented toward the row of cornstalks to be cut.

In the progress of the machine it gathers the stalks in such a flaring mouth and guides them to the shears M, which form a continuation of said mouth, as shown. The reel in its rotation holds said stalks upright until they are cut, and then lays them lengthwise in the trough O, the guard V' preventing their falling outside the trough. The rotation of the chains F' cause the bars H' to carry the stalks thus cut up the inclined table G' and deliver them upon the apron-guide I', where they slide down the apron into the cradle. Whenever a sufficient quantity has accumulated for a gavel or bundle, the driver, pressing his foot upon the treadle O', releases the latch-stop L' from its engagement with the notch in the disk K', when the weight of the gavel compels the cradle to rotate partially and deposit the same upon the ground. As soon as the cradle begins to rotate the driver removes the pressure from the treadle, when the spring W' compels the latch to engage with the succeeding notch in the disk, and thus stops the cradle when it has made half a revolution, and when its opposite fingers are presented to receive the next deposit of stalks.

What I claim as my invention is—

1. In a corn-harvester, the combination of the traction-wheel, the flaring mouth, the shears, each blade of which is provided with an outward extension working through a slot in one side of such mouth, intermediate actuating mechanism for the same, a rotating reel, and a receiving-trough, substantially as and for the purposes described.

2. In a corn-harvester, the combination of the receiving-trough provided with a flaring mouth or jaws, vibrating cutters operating in said mouth or between said jaws, each cutter provided with an outward-extending guard, substantially as and for the purpose described.

3. In a corn-harvester, the flaring mouth N, and shear-blades M, operating in said mouth, and provided with the outward-inclined guards *m'*, in combination with the main traction-wheel B, the shafts E H, bevel-wheels F G, double crank-shaft J K, wheel I, and pitman L, the parts being constructed, arranged, and operating substantially as specified.

4. In a corn-harvester, the combination, with the reel, the elevator-belts F', and the main traction-wheel B, of the shaft E, having the bevel-pinion P, the shaft R, provided with the bevel-wheel Q, bevel-pinion S, sprocket-wheel W, and intermediate mechanism, whereby motion is imparted to the reel and the elevator-belts, substantially as described.

5. The combination, in a corn-harvester, of a trough in line with the cutters, an inclined table forming a side of said trough, a carrier traveling over said table, an oppositely-inclined apron-guide slotted at its lower edge, and a rotating shaft journaled thereto and carrying cradle-fingers coincident with the slots, substantially as and for the purpose described.

RICHARD B. ROBBINS.

Witnesses:
J. A. GAMMILL,
L. CRANNELL.